United States Patent
Chang

(10) Patent No.: US 9,800,641 B2
(45) Date of Patent: Oct. 24, 2017

(54) PRE-FETCHED ENCODING FOR APPLICATION STREAMING

(71) Applicant: Google Inc., Mountain View, CA (US)

(72) Inventor: Chuo-Ling Chang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 308 days.

(21) Appl. No.: 14/703,106

(22) Filed: May 4, 2015

(65) Prior Publication Data

US 2016/0330264 A1   Nov. 10, 2016

(51) Int. Cl.

| H04L 29/06 | (2006.01) |
|---|---|
| G06F 3/14 | (2006.01) |
| G06F 9/44 | (2006.01) |
| H04N 21/238 | (2011.01) |
| H04N 21/6336 | (2011.01) |
| H04N 19/50 | (2014.01) |

(52) U.S. Cl.
CPC .......... *H04L 65/607* (2013.01); *G06F 3/1454* (2013.01); *G06F 9/4445* (2013.01); *H04L 67/42* (2013.01); *H04N 19/50* (2014.11); *H04N 21/23805* (2013.01); *H04N 21/6336* (2013.01)

(58) Field of Classification Search
CPC ....... H04L 65/607; H04L 67/42; H04N 19/50; H04N 21/23805; H04N 21/6336; G06F 3/1454; G06F 9/4445
See application file for complete search history.

(56) References Cited

U.S. PATENT DOCUMENTS

| 6,721,850 | B2 | 4/2004 | Hofmann | |
|---|---|---|---|---|
| 7,844,765 | B2 * | 11/2010 | Katayama | G06F 3/14 710/62 |
| 8,650,364 | B2 * | 2/2014 | Zhang | G06F 12/0862 711/137 |
| 8,776,158 | B1 | 7/2014 | Cote | |
| 2005/0105608 | A1 | 5/2005 | Coleman et al. | |
| 2008/0002894 | A1 | 1/2008 | Hayon et al. | |
| 2008/0181492 | A1 | 7/2008 | Abe et al. | |
| 2009/0097751 | A1 | 4/2009 | McDowell | |
| 2012/0194534 | A1 | 8/2012 | Benno | |
| 2013/0054728 | A1 | 2/2013 | Amir | |

OTHER PUBLICATIONS

International Search Report and Written Opinion in International Application No. PCT/US2016/030712, dated Jul. 21, 2016, 10 pages.

* cited by examiner

*Primary Examiner* — John B Walsh
(74) *Attorney, Agent, or Firm* — Fish & Richardson P.C.

(57) ABSTRACT

Systems and methods for pre-fetched encoding for application streaming. In some implementations, an indication at a server computer system that a client device has a plurality of representations of template frames may be received. Multiple image frames, provided to a client device by the server computer system, where the processing of each image frame includes determining whether the image frame satisfies a threshold similarity to one of the template frames, may be processed. The operations performed for each image frame that satisfies the threshold similarity to one of the template frames may include, generating a representation of a difference between the image frame and the template frame with which the image frame satisfies the threshold similarity, generating an instruction for rendering the image frame, and providing the instruction to the client device.

20 Claims, 7 Drawing Sheets

PRE-FETCHED ENCODING FOR APPLICATION STREAMING

FIELD

The present specification relates to application streaming.

BACKGROUND

In application streaming, a server may execute an application and stream video rendered for the application to a remote client device used by a user. The user may then interact with the application based on the video streamed to the client device. The video generated by the server may be captured on the server as video frames, encoded as video bit-streams, and sent to the client for decoding and playback.

To maintain high interactivity, the reduction of latency between content generation at the server and content playback at the client may be desired. Latency in application streaming may lead to unsatisfactory user experiences. For example, latency may cause an application to seem unresponsive or cause lag. Latency may be due to in large part to three factors, server processing time, client processing time, and network transport time. Server processing time and client processing time may be largely dependent on the computational resources available and may not vary much across video frames. However, network transport time may increase as an encoded bit-stream size of a video frame increases for a given network bandwidth.

Video frames containing sudden content changes such as a window popping up in desktop applications or a scene-transition animation between levels in games may be usually difficult to encode due to the amount of new information present in the content. To encode these frames using conventional video coding algorithms, the server may either limit the encoded bit-stream size by degrading the image quality in encoder settings in order to meet latency requirements, or may maintain the quality but sacrifice latency with an increased bit-stream size.

SUMMARY

In general, one innovative aspect of the subject matter described in this specification can be embodied in methods that may include the actions of receiving, at a server computer system, an indication that a client device has a plurality of representations of template frames, and processing, by the server computer system, multiple image frames to provide to the client device, where the processing of each image frame includes determining whether the image frame satisfies a threshold similarity to one of the template frames. For each image frame that satisfies the threshold similarity to one of the template frames, additional actions include generating a representation of a difference between the image frame and the template frame with which the image frame satisfies the threshold similarity, generating an instruction for rendering the image frame, the instruction including (i) an identification of the representation of the template frame with which the image frame satisfies the threshold similarity and (ii) the representation of the difference between the image frame and the template frame, and providing the instruction to the client device.

Other versions include corresponding systems, apparatus, and computer programs, configured to perform the actions of the methods encoded on computer storage devices.

These and other versions may each optionally include one or more of the following features. For instance, in some implementations, for each image frame that does not satisfy the threshold similarity to one of the template frames, the actions may include: providing the client device either a representation of the image frame or a representation of a difference between the image frame and another image frame processed immediately before the image frame.

In some implementations, the threshold similarity includes determining that the image frame is most similar to a particular template frame from the one or more template frames and an immediately preceding image frame of the image frame.

In some implementations, determining whether the image frame satisfies a threshold similarity to one of the template frames may include, for each image frame, the actions of determining a distance score between a signature of the image frame and a signature of one of the template frames, determining that the distance score between the signature of the image frame and the signature of one of the template frames satisfies a distance threshold, and in response to determining that the distance score between the signature of the image frame and the signature of the template frame satisfies the distance threshold, determining that the image frame satisfies the threshold similarity to one of the template frames.

In some implementations, determining a distance score between a signature of the image frame and a signature of one of the template frames may include generating the signature of the image frame based on a luminance histogram of pixels of the image frame.

In some implementations, processing multiple image frames to provide to the client device may include the actions of identifying a particular application for which the multiple image frames are to be rendered, determining, by the server computer system, that template frames are associated with the particular application, and providing, by the server computer system, a request to the client device to provide an indication whether the client device has a plurality of representations of the template frames associated with the particular application, where receiving, at the server computer system, the indication that the client device has the plurality of representations of template frames, is in response to providing the request.

In some implementations, generating a representation of a difference between the image frame and the template frame with which the image frame satisfies the threshold similarity may be based on encoding the image frame immediately after encoding the template frame as a non-predictive frame at a pre-defined quality.

In some implementations, the actions may include: obtaining, at the server computer system, a set of multiple image frames from which to generate the template frames; processing, by the server computer system, the set of multiple image frames from which to generate the template frames, where the processing of each image frame of the set of multiple image frames from which to generate the template frames includes, for each image frame of the set of multiple image frames from which to generate the template frames, determining whether the image frame satisfies a threshold difference to a previous image frame; for each image frame that satisfies the threshold difference to a previous image frame: generating a representation of the image frame as a template frame; for each image frame that satisfies the threshold difference to a previous image frame, providing the generated template frame to the client device; determining whether a total size of the generated template frames satisfies a size threshold; and in response to determining that a total size of the generated template frames satisfies a size threshold, providing a subset of the generated template frames to the client device.

In some implementations, providing a subset of the generated template frames to the client device may include the actions of providing the generated template frames that correspond to image frames that are more dissimilar than other generated template frames to preceding image frames.

Encoding a video frame may be independent of other video frames, e.g., encoding for a non-predictive frame, or dependent on other video frames, e.g., encoding for a predictive frame. For example, where a video frame is very different from a previous frame, an encoded bit-stream of the video frame may be independent of any other video frames, and where a video frame is similar to a previous video frame, the encoded bit-stream of a video frame may represent a difference between the video frame and the previous video frame. Accordingly, an encoded bit-stream size of a video frame may increase as the difference between the video frame and an immediately prior video frame increases.

The system may reduce the encoded bit-stream size of video frames by prefetching encoded bit-streams of video frames from a server to a client device. When the server streams video for application to a client device, the server may determine that a particular video frame is more similar to a video frame with an encoded bit-stream that is already pre-fetched on the client device than the immediately prior encoded video frame. In response to the determination, the server may determine to encode the particular video frame as a predictive frame that depends on prediction from the video frame corresponding to the pre-fetched encoded bit-stream, provide the encoding to the client device, and instruct the client device to decode the encoding based on the pre-fetched encoded bit-stream instead of the encoded bit-stream for the previous video frame. Accordingly, a system may reduce latency in application streaming by reducing the encoded bit-stream size of video frames by using prefetched encoded bit-streams.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1A:
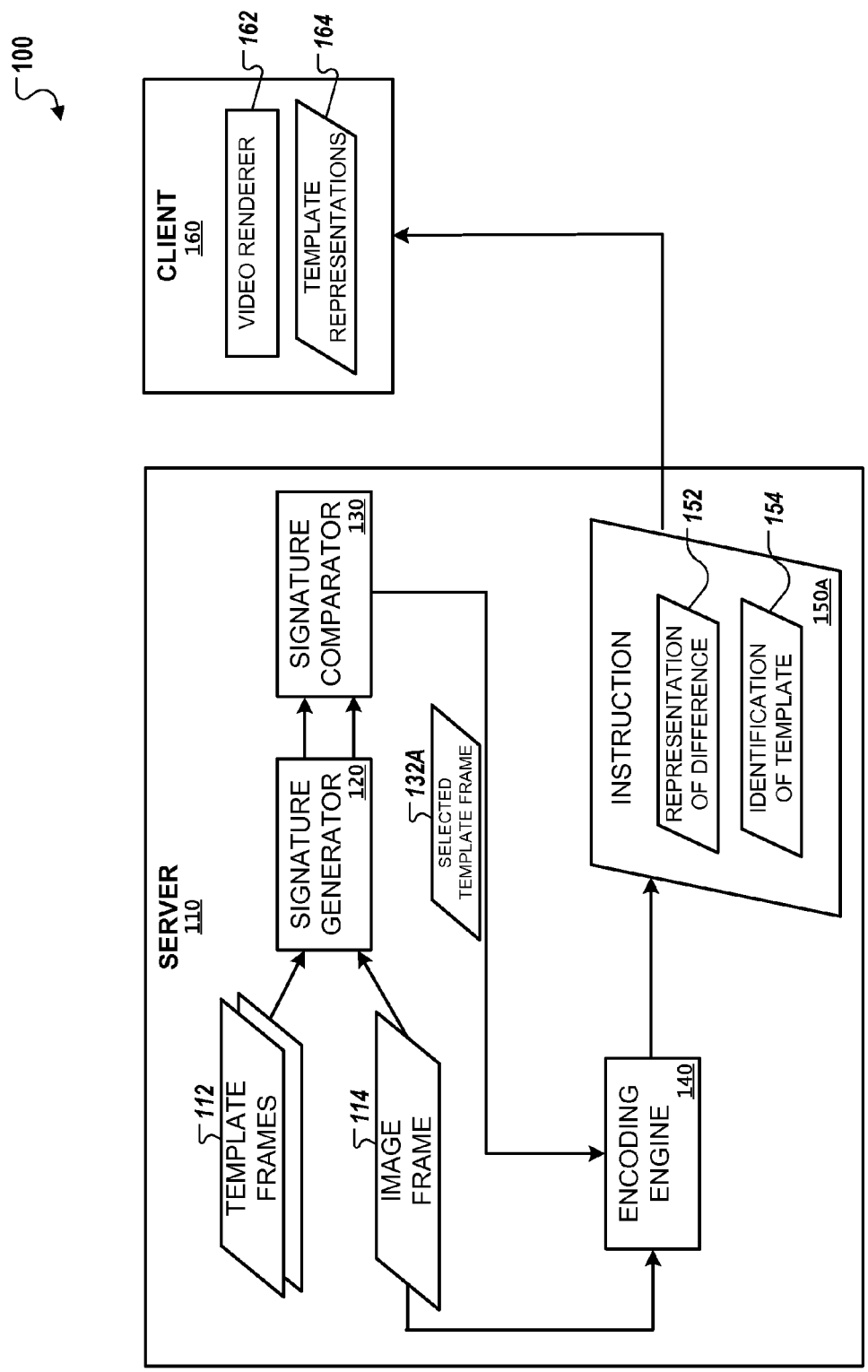
FIG. 1A-1B are block diagrams of an example system for an interactive streaming session.

FIG. 1A is a block diagram of an example system 100 for an interactive streaming session. Briefly, and as described further below, the system 100 may include a server 110 and a client device 160. The server 110 may include template frames 112, an image frame 114, a signature generator 120, a signature comparator 130, a selected template frame 132A, an encoding engine 140, and an instruction 150A. The client device 160 may include a video renderer 162 and template representations 164.

The template frames 112 may be frames of video content previously generated for applications on the server 110 for which corresponding template representations 164, i.e., encoded bit-streams, are pre-fetched on the client device 160. For example, the template frames 112 may be particular frames rendered for a game being run on the server 110, where the particular frames include substantial differences from their immediately prior frame. Frames that include substantial differences from their immediately prior frame may include scene-change animations, dialog boxes, scoreboards, or other video frames, that are routinely displayed and are different from previous frames.

The image frame 114 may be a frame of video rendered for an application on the server 110 being streamed to the client device 160. For example, the image frame 114 may be a frame rendered for a cloud video game application being played by a user of the client device 160.

The signature generator 120 may compute signatures of the template frames 112 and the image frame 114. The signature for a frame may generally describe the content of the frame. For example, the signature of a frame may be based on luminance-values of pixels in an image. The signature may additionally or alternatively be calculated using other image processing parameters. For example, contrast ratios, natural color ratios, pixel color values, and other parameters.

In some implementations, the signature generator 120 computes the signatures for each of the template frames 112 and the image frame 114 by initially dividing a frame luminance of the frame, a 2D array of 1-byte integers having values from 0-255, evenly into N smaller 2D blocks. For example, a 960×640 pixel frame may be divided into N=100 blocks, where each block include 96×64 pixels. The signature generator 120 may then compute the luminance value histogram for each of the N blocks, which represents the number of occurrences of luminance values within each block. The signature generator 120 may then concatenate the N histograms to calculate the signature of the frame.

The signature comparator 130 may compare the signature of the image frame 114 to the signature of one or more of the template frames 112 and a signature of an immediately preceding image frame. The immediately preceding image frame may include an image frame that is encoded immediately before the image frame 114 is to be encoded, i.e., the frame that is displayed before the image frame 114. Using the comparison, the signature comparator 130 may determine whether the image frame 114 satisfies a threshold similarity to one of the template frames. The threshold similarity may be that the image frame is most similar to a particular template frame out of both the templates frames 212 and the immediately preceding frame. In some cases, the image frame 114 may not have an immediately preceding image frame if the image frame 114 is the first frame to be encoded. Accordingly, in these cases, the threshold similarity may be that the image frame is most similar to a particular template frame and the similarity is above a predetermined minimum similarity threshold.

The signature comparator 130 may compare the signatures of the image frame 114 and the preceding image frame using a distance score for the two signatures. For example, the distance score of two signatures may be computed by summing the difference in corresponding luminance-values for each of the N blocks of the two respective frames, and normalizing the summed difference by the sum of the luminance-values of the N blocks of the image frame 114. Lower distance scores may correspond to frames that are similar. For example, a distance score of "0" may correspond to frames that are very similar.

Out of an immediately preceding frame and the template frames 112, the signature comparator may select the frame with the signature that is most similar to the signature of the image frame 114 and output a selected template frame 132A. For example, the image frame 114 may be a start screen that follows opening cinematics, where the start screen includes text that changes based on a user's name, a template frame may also correspond to the start screen with a different user's name, and the immediately preceding frame may be for the end of the opening cinematic. In the example, the signature comparator 130 may determine that the signature of image frame 114 is most similar to the signature of the template frame that corresponds to the start screen with a different user's name. The signature comparator 130 may determine the most similar frame based on determining the frame for which the distance score corresponds to the most similarity, e.g., is closest to "0."

The selected template frame 132A may be the template frame of the template frames 112 that is identified by the signature comparator 130 to be the most similar to the image frame 114. For example, the signature comparator 130 may compare the distance scores between each of the template frames 112 and the image frame 114, and identify the template frame with the lowest distance score as the selected template frame 132A.

The encoding engine 140 may be a video encoder on the server 110 that encodes the image frame 114. The encoding engine 140 may be configured to encode an image frame using a video codec, e.g., MPEG-4, DivX Pro, Xvid, or x264. The encoding engine 140 may receive the selected template frame 132A, or an indication of the selected template frame, and may use the selected template frame to encode the image frame 114. For example, the encoding engine 140 may receive an indication that "TEMPLATE FRAME X" is most similar to the image frame 114, and in response, encode the image frame 114 based on the difference of the image frame 114 and "TEMPLATE FRAME X."

The encoding engine 140 may generate an instruction 150A. The instruction 150A may include a representation 152 and an identification 154. The representation 152 may be a representation of the difference between the image frame 114 and the selected template frame 132A. For example, where the image frame 114 is of a start screen with a user's name and the template frame 112 is of a start screen with a different name, the representation of the difference 152 may an encoded bit-stream that represents the differences in the pixels corresponding to the different names. The identification 154 may identify a particular template representation of the template representations 164 stored on the client device 160 to use for rendering the image frame 114. For example, the identification 154 may be, "TEMPLATE REPRESENTATION X," which corresponds to a representation of "TEMPLATE FRAME X."

The encoding engine 140 may generate the representation of the difference between the image frame 114 and the selected template frame 132A by encoding the selected template frame 132A using a video codec, and then encoding the image frame 114 using the video codec along with an indication that the image frame 114 is to be encoded based on the frame just encoded. For example, the encoding engine 140 may first encode a template frame of a start screen with a different name, discard the representation of the template frame, and then encode an image frame of a start screen with a user's name with predictive encoding and use the output as the representation of the difference between the template frame and the image frame.

The selected template frame 132A may be encoded as a non-predictive frame, for e.g., independent of any other video frames, and at the same quality level as the corresponding template representations pre-fetched by the client device 160. This may ensure that the prediction from the selected template frame 132A generated by the encoding engine 140 is the same frame as the template representations 164 on the client device 160.

The client device 160 may include a video renderer 162 and template representations 164. The template representations 164 may be a pre-fetched set of representations of the template frames 112 on the server 110. The template representations 164 may be encoded bit-streams of the template frames 112, where the encoding is done by a video codec along with an indication that the template frames 112 are to be encoded independently of any other frames.

The video renderer 162 may perform video decoding operations on the client device 160. For example, the video renderer 162 may perform decoding operations using the H.264 video standard, or some other video codec. The video renderer 162 may render the image frame 114 on the client device 160 based on the identification of the template 154 and the representation of the difference 152 between the image frame 114 and the selected template frame 132A. For example, the video renderer 162 may determine that the instruction 150A identifies "TEMPLATE REPRESENTATION X" which corresponds to a representation of a start screen with a default user name and includes a representation of the difference between a start screen with a default user name and a start screen with the current user's name.

In response, the video renderer 162 may access the template representation pre-fetched on the client device 160, and modify the template representation based on the representation of the difference between the image frame 114 and the selected template frame 132A. For example, the video renderer 162 may access "TEMPLATE REPRESENTATION X," decode "TEMPLATE REPRESENTATION X" into "TEMPLATE FRAME X," not display "TEMPLATE FRAME X," and then decode the representation of the difference between a start screen with a default user name and a start screen with the current user's name based on the frame just decoded, "TEMPLATE FRAME X."

Accordingly, instead of providing an encoded representation of image frame 114 encoded based on an immediately preceding image frame in a video or based on no previous frame, the server 110 may reduce a size of an encoding for the image frame 114 by encoding a template frame similar to the image frame 114 and then encoding the image frame 114 based on the encoding of the template frame.

Figure 1B:
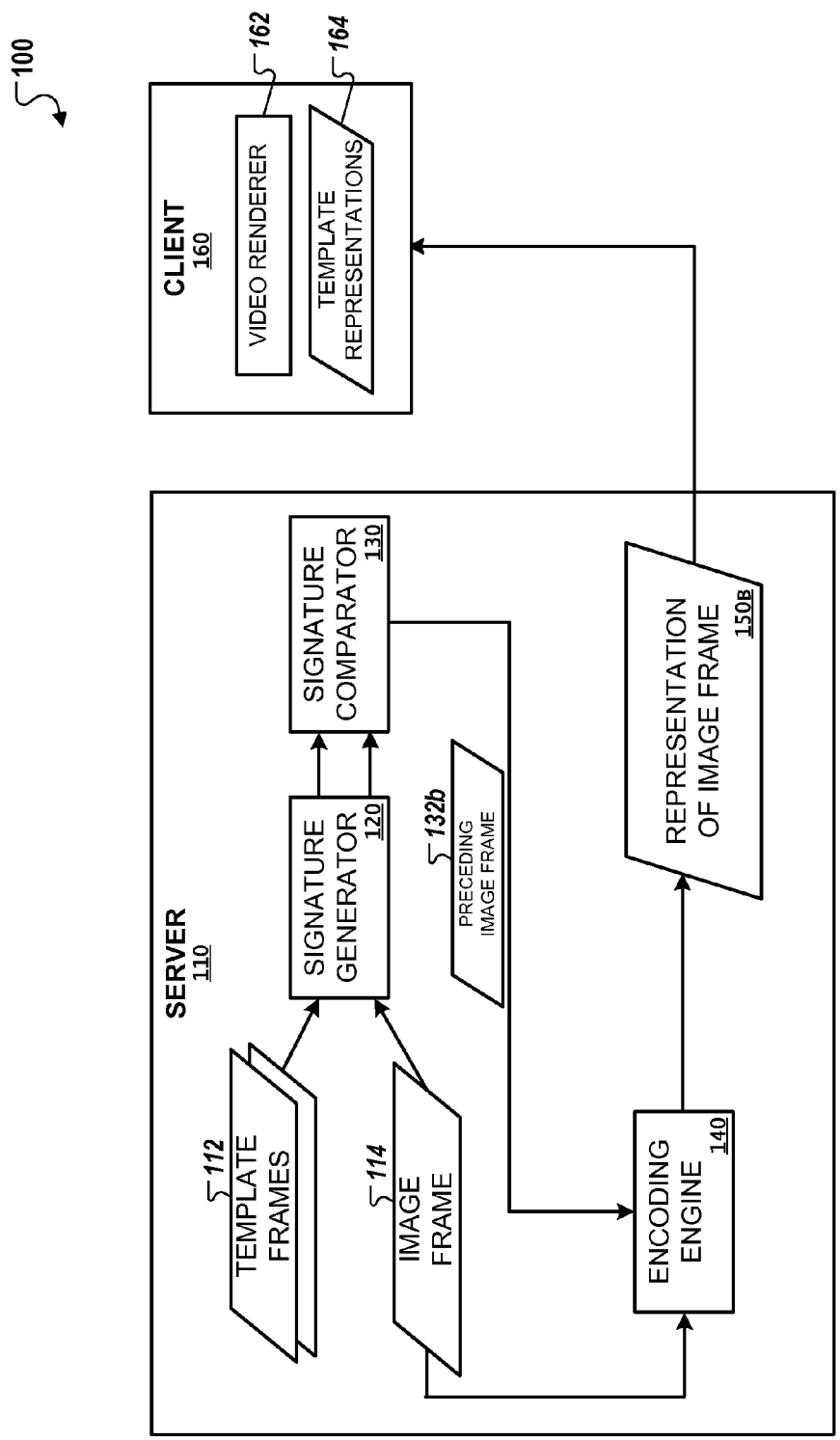

FIG. 1B represents a streaming session where the server 110 determines that the image frame 114 does not satisfy a threshold similarity to any of the template frames 112. For example, the signature comparator 130 may determine that the image frame 114 is more similar to a preceding image frame than similar to any template frame 112. The signature comparator 130 may determine that a preceding image is more similar to the image frame 114 than any of the template frames 112 based on determining that the distance scores for the signatures of the image frame 114 and the preceding image are lower than the distance scores between the signatures of the image frame 114 and the template frames 112. For example, the signature comparator 130 may determine that for an image frame 114 that only shows a slight change from the preceding image frame 132b, e.g., only a few pixels are different, the signature of the image frame 114 is most similar to the signature of the preceding image frame 132b over the signatures of the template frames 112. In such cases, the encoding engine 140 may encode the image frame 114 by generating a representation of the image frame 114 based on the immediately preceding image frame. In some implementations, when the image frame 114 and the preceding image 132b do not satisfy a threshold similarity, e.g., below 20%, 30%, or some other amount similar, the encoding engine 140 may encode the image frame 114 as a representation of the image frame 114 that is not based on any other frame.

Figure 2:
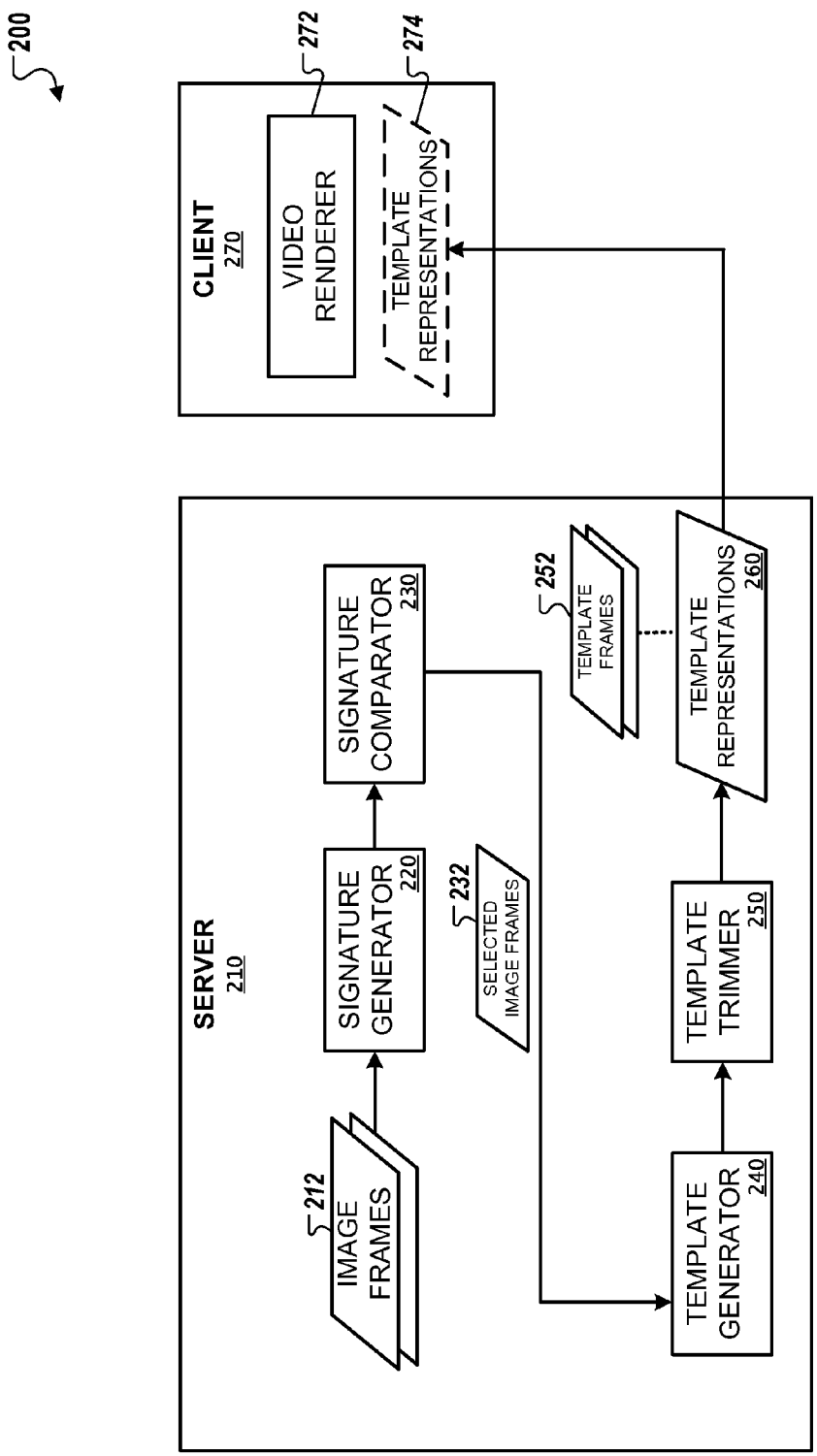
FIG. 2 is a block diagram of an example system for a pre-fetch preparation session.

FIG. 2 illustrates an example system 200 for a pre-fetch preparation session. The pre-fetch preparation session may occur before an application is streamed to a client using template frames, and may be a session during which the template frames and the template representations used for application streaming are generated. Briefly, and as described further below, the system 200 may include a server 210 and a client device 270. The server 210 may include images frames 212, a signal generator 220, a signature comparator 230, a template generator 240, a template trimmer 250, template frames 252, and template representations 260. The client device 270 may include a video renderer 272 and template representations 274.

The image frames 212 may be frames of content generated from a streaming application on the server 210 for display on the client device 270. For example, the image frames 212 may include a stream of image frames that correspond to playing of a game that will be streamed, where some of the image frames are similar to a preceding frame, e.g., player has moved a cursor in a start menu, and some of the image frames are dissimilar to a preceding frame, e.g., player has selected an option in a start menu that has triggered a cinematic.

The signature generator 220 may calculate the signatures of the image frames 212. In some implementations, the signature generator 220 may calculate the signatures according to the calculation described previous in FIG. 1A. The signature comparator 230 may compare the signatures of the each of the image frames 212 to the signatures of immediately preceding image frames of the image frames 212 to determine whether each of the image frames 212 satisfy a threshold difference with the immediately preceding image frames of the image frames 212. In some implementations, the signature comparator 230 determines whether the image frames 212 satisfy a threshold difference using a similar comparison technique used by the signature comparator 130. In one example, the signature comparator 230 may determine that one of the image frames 212 is below the threshold difference to its immediately preceding image frame, e.g., where the image frame represents a start menu in which a cursor has moved. In another example, the signature comparator 230 may determine that one of the image frames 212 satisfies the threshold difference to its immediately preceding image frame, e.g., where the image frame represents a transition between displaying a start menu to a cinematic.

The signature comparator 230 may select the image frames that satisfy the threshold difference from their previous frames and provide the selected image frames, or identifications of the selected image frames, to the template generator 240. For example, the signature comparator 230 may select an image frame where a full screen menu option is opened, and an image frame where a cinematic is started after a start menu, and provide those image frames or identifications of those image frames to the template generator 240.

The template generator 240 may generate template frames 252 based on the selected image frames 232 transmitted from the signature comparator. For example, the template generator 240 may designate the selected image frames 232 as template frames, and generate corresponding template representations of the selected image frames 232 by encoding the selected image frames 232 as frames that are independent of any other frames.

In generating the template frames 252 and template representations 260, the template generator may generate a frame array, signature array, and a representation array that are all initially empty. These arrays may be container objects that store certain values of a single type. For example, the frame array may store the template frames 252, the signature array may store the calculated signatures of the image frames 232 selected to be template frames 252, and the representation array may store the encoded bit-streams of the template frames 252. The signature array may be later used during live sessions so that the signatures of template frames do not need to be calculated again.

The template generator 240 may add the template frames 252 into frame array and also add the corresponding signatures of the template frames 252 into the signature array. The template generator 240 may then encode the template frames 252 into template frame representations using a predefined quality level. Once the template generator 240 completes encoding all of template frames 252 into the template frame representations, the template generator 240 may add the template frame representations into the representation array. The template frames 252 may be encoded as non-predictive frames, for e.g., independent of any other video frames, and at the same quality and at a predefined quality level.

In some implementations, the template generator 240 may initially receive image frames from one or more practice live sessions run on the server 210 to identify image frames that are frequently streamed to the client devices. The template generator 240 may compare the image frames that are likely to be streamed during a live session to the selected image frames transmitted from the signature comparator 230 to select a set of template frames that correspond to selected image frames that are likely to be streamed during a live session. In other implementations, the template generator 240 may prepare template frames that include all of the selected image frames transmitted by the signature comparator 230.

The size of the representation array may reflect the startup delay in the live session for the client device 270 to pre-fetch the representation array over the network. For example, when the client device 270 initially requests an application for streaming from a server, the server may provide the representations of template frames to the client device 270 to pre-fetch, and then begin streaming live video for the application. In some instances, the size of the representation array may be sufficiently large to suggest significant latency in the pre-fetch stage of the live session. For example, pre-fetching a large representation array may take a few seconds and may make the application seem unresponsive. Accordingly, in some implementations, the template generator 240 may compare the size of the generated representation array to a threshold size and based on determining that the size of the generated representation array is greater than the threshold size, transmit the generated representation array to a template trimmer 250. The threshold size may be, for example, 200 KB, 1 MB, 5 MB, 10 MB, or some other size.

In some implementations, the threshold size may be dependent on the network bandwidth available for transmitting to the client device 270. For example, as network bandwidth available for transmitting to the client device 270 increases, the threshold size may increase.

The template trimmer 250 may reduce the size of the generated representation array by removing template frame representations from the representation array and frame array. For example, the template trimmer 250 may initially prioritize the template frame representations by comparing the distance scores between the signatures of the selected image frames 252 and its immediately preceding image frame. In another example, the template trimmer 250 may also compare the signatures of the template frames 252 and consolidate the template frames 252 that are similar to each other. The template trimmer 250 may determine that the lower distance scores represent image frames that are less valuable for prediction because the transition between the these image frames may have a smaller performance impact in the live session than image frames with greater distance scores with their preceding image frames. The template trimmer 250 may then remove the template representations in the representation array by lowest distance score first until the representation array is below the threshold size.

The client device 270 may pre-fetch the template representations 260 from the server 210 and store them on the client device 270 as template representations 272. The video renderer 272 of the client device 270 may then perform decoding using the template representations 274, for example, similarly as the video renderer 162.

Figure 3A:
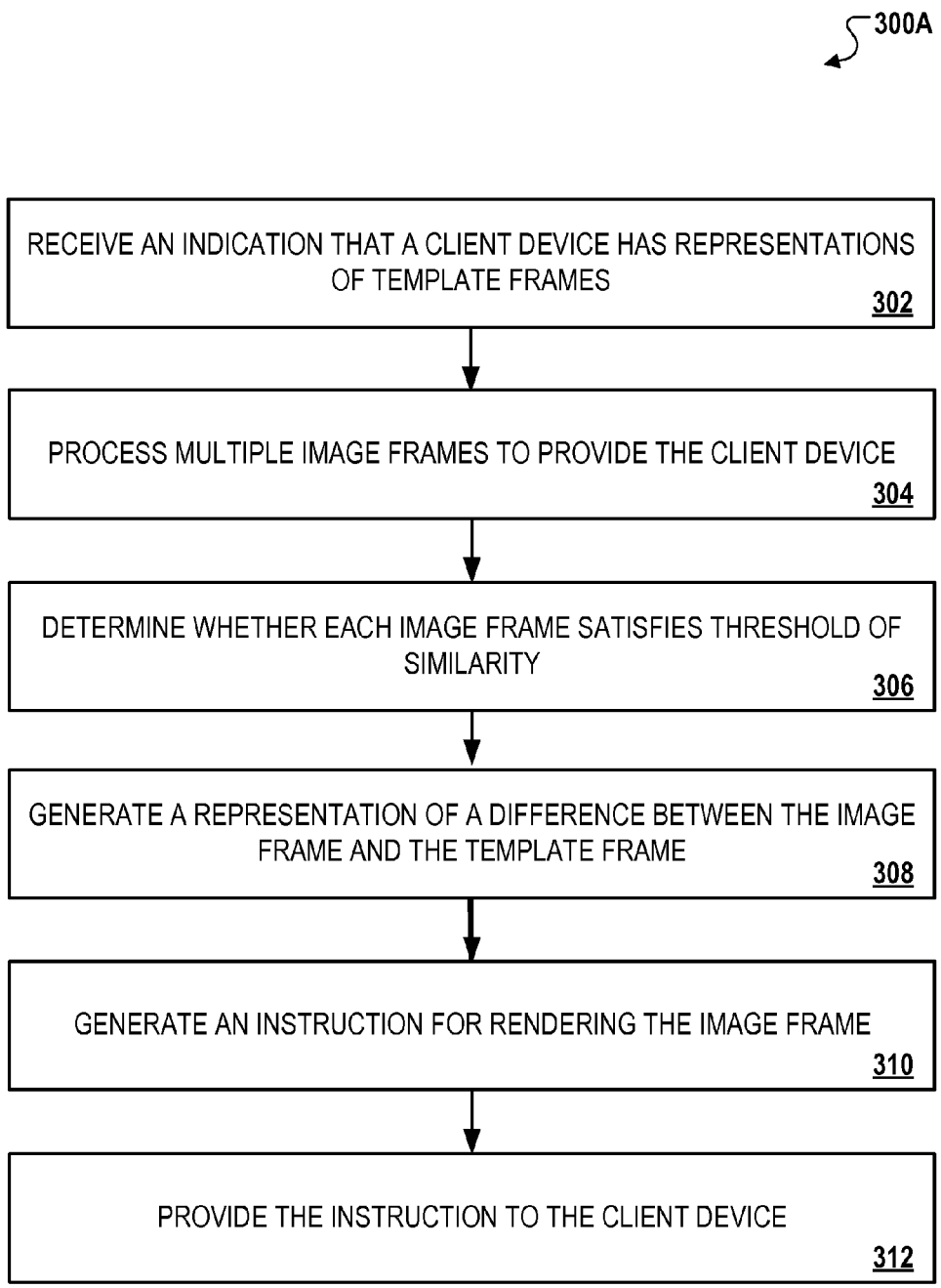
FIGS. 3A-3C are flowcharts of example processes for using pre-fetched encoded representations of template frames.
Figure 3B:
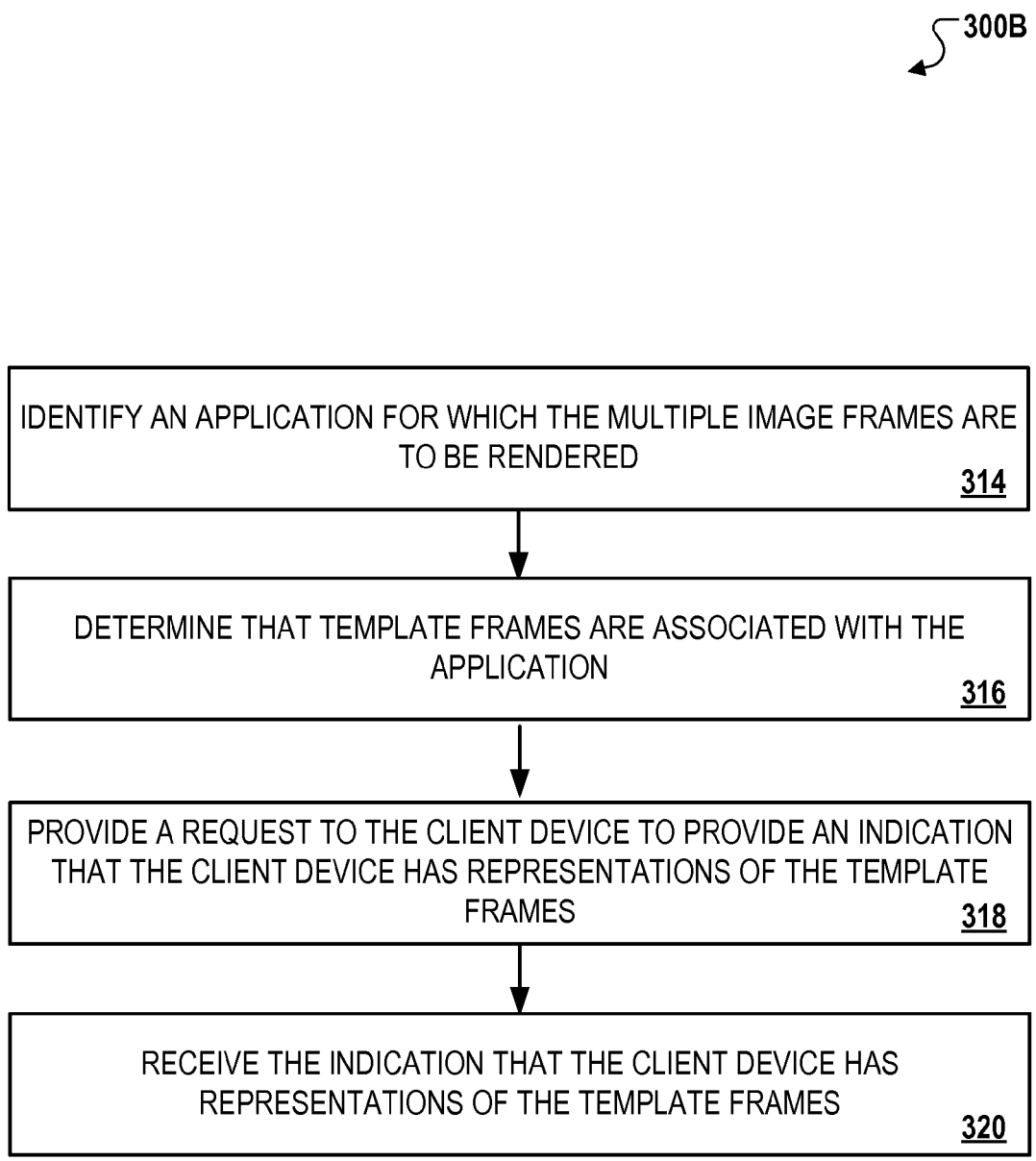
Figure 3C:
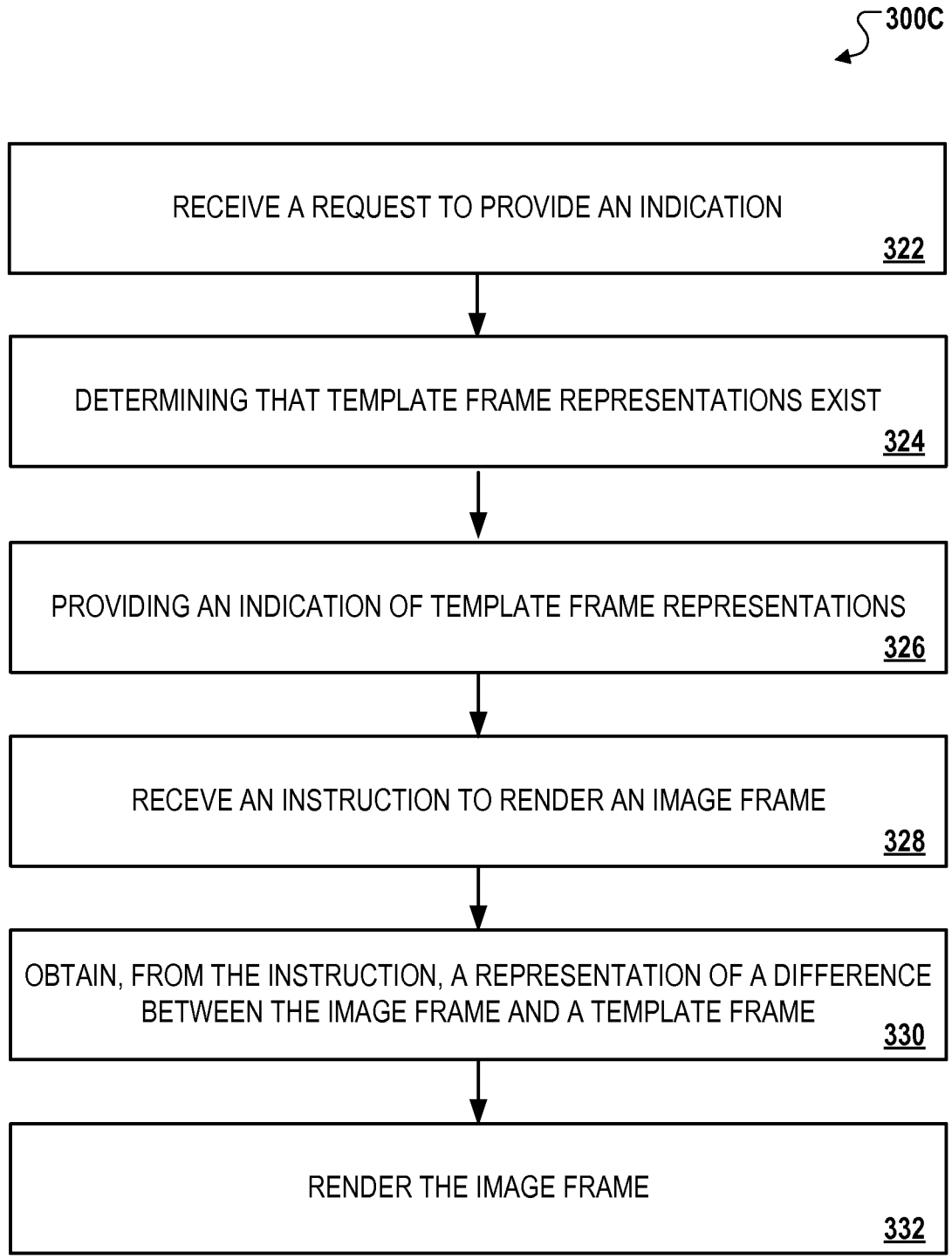

FIGS. 3A-3C illustrate example processes for streaming pre-fetched encoded representations of template frames. The following describes the processes 300A, 300B, and 300C as being performed by components of the system 100 and the system 200 that is described with reference to FIGS. 1A-1B and FIG. 2, respectively. However, the processes 300A, 300B, and 300C may be performed by other systems or system configurations.

FIG. 3A is a flowchart of an example process 300A for streaming an application to a client using template frames. The process 300A may include receiving an indication that a client device has representations of template frames (302). For example, the server 110 may receive an indication that the client device 160 has finished pre-fetching a set of template representations the server 110 provided to the client device 160 in response to a request from the client device 160 to begin streaming an application. In another example, the server 110 may receive a transmission from the client device 160 including a request to use an application and indicating that there are a set of pre-fetched template representations 164 on the client device 160.

The process 300A may include processing multiple image frames to provide the client device (304). For example, the server 110 may generate multiple image frames corresponding to a video game that a user is playing using the application. In the example, the multiple image frames may include images frames corresponding to a player running around and opening a full screen options menu. The signature generator 120 may then determine signatures for the image frames 114, and obtain pre-stored signatures of the template frames 112.

The process 300A may include determining whether each image frame satisfies a threshold of similarity (306). For example, the signature comparator 130 may determine, for each image frame, whether a distance score between the signatures of the image frame and of a particular template frame is lower than (i) the distance score between the signatures of the image frame and of their immediately prior image frame, and (ii) the distance scores between the signatures of the image frame and of any other template frames, and whether the distance score between the signatures of the image frame and of the particular template frame is also lower than a predetermined minimum distance threshold.

The process 300A may include generating a representation of a difference between the image frame and the template frame (308). For example, in cases where the threshold of similarity is satisfied based on a particular template frame, the encoding engine 140 may generate a representation of a difference between the image frame and the particular template frame by first encoding the particular template frame as a non-predictive frame at a pre-defined quality level, discarding the encoding of the particular template frame, and then encoding the image frame as an image based on the frame just encoded.

The process 300A may include generating an instruction for rendering the image frame (310). For example, the encoding engine 140 may generate the instruction 150A, which includes the representation of difference 152 between a particular image frame to be rendered on the client 160 and a particular template frame, and the identification of the particular template 154, which identifies to the client device 160 the particular pre-fetched template representation to use for decoding the image frame.

The process 300A may include providing the instruction to the client device (312). For example, the server 110 may transmit the instruction 150A to the client device 160 as a data transmission over a network.

FIG. 3B is a flowchart of a process 300B for a server to begin streaming an application using template frames. The process 300B may include identifying an application for which the multiple image frames are to be rendered (314). For example, the server 110 may identify that a client device 160 has requested to stream a particular application.

The process 300B may include determining that template frames are associated with the application (316). For example, the server 110 may determine that the particular application that the client device 160 has requested to stream is associated with a particular set of template frames.

The process 300B may include providing a request to the client device to provide an indication that the client device has representations of the template frames (318). For example, in response to determining that template frames are associated with the particular application, the server 110 may provide the representations of template frames to the client device 160 and request that the client device 160 provide an indication that the client device 160 has received the representations of the template frames. In another example, the server 110 may determine that the client device 160 may already store representations of the template frames and request that the client device 160 provide an indication what representations of template frames the client device 160 already has stored. The server may provide the request over a network.

The process may include receiving the indication that the client device has representations of the template frames (320). For example, the server 110 may receive a data transmission over a network from the client device 160 identifying the representations of template frames the client device 160 has stored on the client device 160, or acknowledging that the client device 160 has received representations of template frames provided to the client device 160 by the server 110. In response, the server 110 may determine the representations of template frames that the client device 160 has pre-fetched for the application, and stream the application using those template frames corresponding to the pre-fetched representations on the client device 160.

FIG. 3C is a flowchart of a process 300C for a client device to render an image frame using pre-fetched template representations. The process may include receiving a request to provide an indication (322). For example, the client device 160 may receive a request from the server 110 to provide a list of the template representations on the client device 160 or an acknowledgment that the client device 160 has finished receiving a set of template representations from the server 110. In some implementations, the request may be specific to a particular application. For example, the request may identify a particular application for which the client device 160 should list available template representations.

The process may include determining that template frame representations exist (324). For example, the client device 160 may determine which template representations are stored on the client device 160.

The process may include providing an indication of template frame representations (326). For example, the client device 160 may transmit a signal to the server 160 indicating which template representations are on the client device 160, or that the client device 160 has finished receiving a set of template representations from the server 160.

The process may include receiving an instruction to render an image frame (328). For example, the client device 160 may receive an instruction to render an image frame where the instruction identifies a particular template representation and includes a representation of a difference between the template frame corresponding to the template representation and the image frame.

The process may include obtaining from the instruction, a representation of a difference between the image frame and a template frame (330). For example, the client device 160 may extract the representation of difference 152 from the received instruction 150A from the server 110.

The process may include rendering the image frame (332). For example, the client device 160 may decode the representation of the template frame, discard the result of the decoding, and then use predictive decoding using the representation of the difference between the image frame and the template frame corresponding to the template representation.

Figure 4:
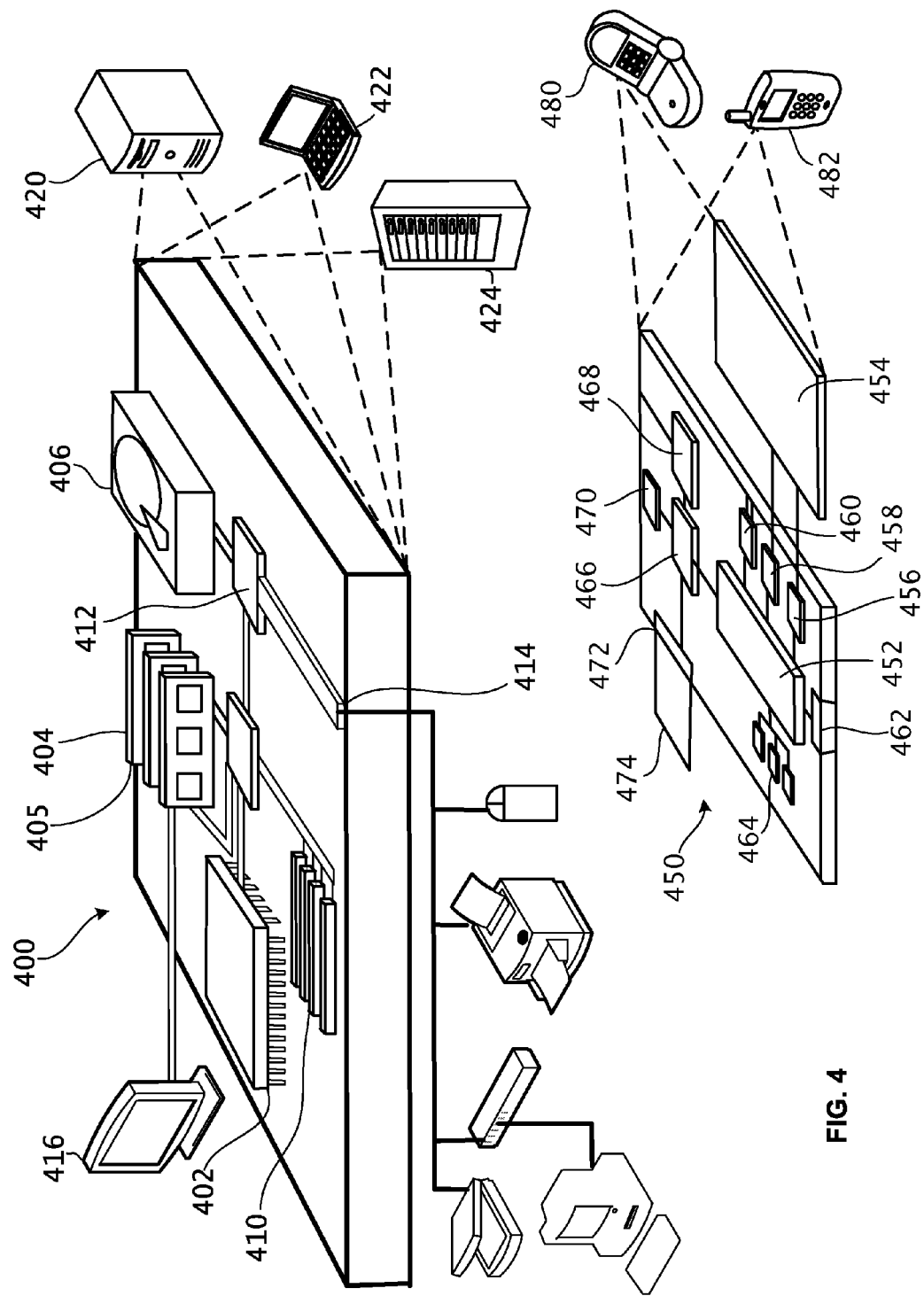
FIG. 4 is a diagram of exemplary computing devices.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, microphone/speaker pair, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, and an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer-implemented method, comprising:
identifying a particular application for which multiple image frames are to be rendered;
determining, by a server computer system, that template frames are associated with the particular application;
providing, by the server computer system, a request to a client device to provide an indication whether the client device has a plurality of representations of the template frames associated with the particular application;
in response to providing the request to a client device to provide an indication whether the client device has the plurality of representations of the template frames associated with the particular application, receiving, at the server computer system, an indication that the client device has the plurality of representations of template frames;
processing, by the server computer system, the multiple image frames to provide to the client device, wherein the processing of each image frame comprises determining whether the image frame satisfies a threshold similarity to one of the template frames;
for each image frame that satisfies the threshold similarity to one of the template frames:
generating a representation of a difference between the image frame and the template frame with which the image frame satisfies the threshold similarity;
generating an instruction for rendering the image frame, the instruction including (i) an identification of the representation of the template frame with which the image frame satisfies the threshold similarity and (ii) the representation of the difference between the image frame and the template frame; and
providing the instruction to the client device.

2. The method of claim 1, wherein for each image frame that does not satisfy the threshold similarity to one of the template frames:
providing the client device either a representation of the image frame or a representation of a difference between the image frame and another image frame processed immediately before the image frame.

3. The method of claim 1, wherein the threshold similarity comprises determining that the image frame is most similar to a particular template frame from the one or more template frames and an immediately preceding image frame of the image frame.

4. The method of claim 1, wherein determining whether the image frame satisfies a threshold similarity to one of the template frames comprises, for each image frame:
determining a distance score between a signature of the image frame and a signature of one of the template frames;
determining that the distance score between the signature of the image frame and the signature of one of the template frames satisfies a distance threshold; and
in response to determining that the distance score between the signature of the image frame and the signature of the template frame satisfies the distance threshold, determining that the image frame satisfies the threshold similarity to one of the template frames.

5. The method of claim 4, wherein determining a distance score between a signature of the image frame and a signature of one of the template frames comprises:
generating the signature of the image frame based on a luminance histogram of pixels of the image frame.

6. The method of claim 1, wherein generating a representation of a difference between the image frame and the template frame with which the image frame satisfies the threshold similarity is based on encoding the image frame immediately after encoding the template frame as a non-predictive frame at a pre-defined quality.

7. The method of claim 1, comprising:
obtaining, at the server computer system, a set of multiple image frames from which to generate the template frames;
processing, by the server computer system, the set of multiple image frames from which to generate the template frames, wherein the processing of each image frame of the set of multiple image frames from which to generate the template frames comprises, for each image frame of the set of multiple image frames from which to generate the template frames, determining whether the image frame satisfies a threshold difference to a previous image frame; and
for each image frame that satisfies the threshold difference to a previous image frame:

generating a representation of the image frame as a template frame.

8. The method of claim 7, comprising:
for each image frame that satisfies the threshold difference to a previous image frame, providing the generated template frame to the client device.

9. The method of claim 7, comprising
determining whether a total size of the generated template frames satisfies a size threshold; and
in response to determining that a total size of the generated template frames satisfies a size threshold, providing a subset of the generated template frames to the client device.

10. The method of claim 9, wherein providing a subset of the generated template frames to the client device comprises:
providing the generated template frames that correspond to image frames that are more dissimilar than other generated template frames to preceding image frames.

11. A system, comprising:
one or more computers; and
a non-transitory computer-readable medium coupled to the one or more computers having instructions stored thereon, which, when executed by the one or more computers, cause the one or more computers to perform operations comprising:
receiving, at a server computer system, an indication that a client device has a plurality of representations of template frames;
processing, by the server computer system, multiple image frames to provide to the client device, wherein the processing of each image frame comprises determining whether the image frame satisfies a threshold similarity to one of the template frames;
for each image frame that satisfies the threshold similarity to one of the template frames:
generating a representation of a difference between the image frame and the template frame with which the image frame satisfies the threshold similarity based on encoding the image frame immediately after encoding the template frame as a non-predictive frame at a pre-defined quality;
generating an instruction for rendering the image frame, the instruction including (i) an identification of the representation of the template frame with which the image frame satisfies the threshold similarity and (ii) the representation of the difference between the image frame and the template frame; and
providing the instruction to the client device.

12. The system of claim 11, wherein for each image frame that does not satisfy the threshold similarity to one of the template frames:
providing the client device either a representation of the image frame or a representation of a difference between the image frame and another image frame processed immediately before the image frame.

13. The system of claim 11, wherein determining whether the image frame satisfies a threshold similarity to one of the template frames comprises, for each image frame:
determining a distance score between a signature of the image frame and a signature of one of the template frames;
determining that the distance score between the signature of the image frame and the signature of one of the template frames satisfies a threshold distance; and in response to determining that the distance score between the signature of the image frame and the signature of the template frame satisfies the threshold distance, determining that the image frame satisfies the threshold similarity to one of the template frames.

14. The system of claim 11, wherein determining a distance score between a signature of the image frame and a signature of one of the template frames comprises:
generating the signature of the image frame based on a luminance histogram of pixels of the image frame.

15. The system of claim 11, wherein processing multiple image frames to provide to the client device comprises:
identifying a particular application for which the multiple image frames are to be rendered;
determining, by the server computer system, that template frames are associated with the particular application; and
providing, by the server computer system, a request to the client device to provide an indication whether the client device has a plurality of representations of the template frames associated with the particular application, wherein receiving, at the server computer system, the indication that the client device has the plurality of representations of template frames, is in response to providing the request.

16. A non-transitory computer storage device encoded with a computer program, the program comprising instructions that when executed by one or more computers cause the one or more computers to perform operations comprising:
obtaining, at a server computer system, a set of multiple image frames from which to generate template frames;
processing, by the server computer system, the set of multiple image frames from which to generate the template frames, wherein the processing of each image frame of the set of multiple image frames from which to generate the template frames comprises, for each image frame of the set of multiple image frames from which to generate the template frames:
determining whether the image frame satisfies a threshold difference to a previous image frame; and
for each image frame that satisfies the threshold difference to a previous image frame, generating a representation of the image frame as a template frame;
determining whether a total size of the generated template frames satisfies a size threshold;
in response to determining that a total size of the generated template frames satisfies a size threshold, providing a subset of the generated template frames to the client device;
receiving, at a server computer system, an indication that a client device has a plurality of representations of template frames;
processing, by the server computer system, multiple image frames to provide to the client device, wherein the processing of each image frame comprises determining whether the image frame satisfies a threshold similarity to one of the template frames;
for each image frame that satisfies the threshold similarity to one of the template frames:
generating a representation of a difference between the image frame and the template frame with which the image frame satisfies the threshold similarity;
generating an instruction for rendering the image frame, the instruction including (i) an identification of the representation of the template frame with which the image frame satisfies the threshold similarity and (ii) the representation of the difference between the image frame and the template frame; and providing the instruction to the client device.

17. The device of claim 16, wherein for each image frame that does not satisfy the threshold similarity to one of the template frames:
    providing the client device either a representation of the image frame or a representation of a difference between the image frame and another image frame processed immediately before the image frame.

18. The device of claim 16, wherein the threshold similarity comprises determining that the image frame is most similar to (i) a particular template frame from the one or more template frames, or (ii) an immediately preceding image frame of the image frame.

19. The device of claim 16, wherein determining whether the image frame satisfies a threshold similarity to one of the template frames comprises, for each image frame:
    determining a distance score between a signature of the image frame and a signature of one of the template frames;
    determining that the distance score between the signature of the image frame and the signature of one of the template frames satisfies a distance threshold; and
    in response to determining that the distance score between the signature of the image frame and the signature of the template frame satisfies the distance threshold, determining that the image frame satisfies the threshold similarity to one of the template frames.

20. The device of claim 16, wherein providing a subset of the generated template frames to the client device comprises:
    providing the generated template frames that correspond to image frames that are more dissimilar than other generated template frames to preceding image frames.

* * * * *